United States Patent
Senshu et al.

(10) Patent No.: US 9,688,565 B2
(45) Date of Patent: *Jun. 27, 2017

(54) GLASS COMPOSITION, GLASS COMPOSITION FOR CHEMICAL STRENGTHENING, STRENGTHENED GLASS ARTICLE, AND COVER GLASS FOR DISPLAY

(71) Applicant: Nippon Sheet Glass Company, Limited, Tokyo (JP)

(72) Inventors: Yutaka Senshu, Tokyo (JP); Junji Kurachi, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/766,331

(22) PCT Filed: Feb. 6, 2014

(86) PCT No.: PCT/JP2014/000646
§ 371 (c)(1),
(2) Date: Aug. 6, 2015

(87) PCT Pub. No.: WO2014/122934
PCT Pub. Date: Aug. 14, 2014

(65) Prior Publication Data
US 2015/0368145 A1    Dec. 24, 2015

(30) Foreign Application Priority Data

Feb. 7, 2013 (JP) ................................. 2013-022082

(51) Int. Cl.
*C03C 3/085* (2006.01)
*C03C 21/00* (2006.01)
*C03C 3/087* (2006.01)
*C03C 4/18* (2006.01)
*C03C 3/091* (2006.01)

(52) U.S. Cl.
CPC .............. *C03C 3/085* (2013.01); *C03C 3/087* (2013.01); *C03C 3/091* (2013.01); *C03C 4/18* (2013.01); *C03C 21/002* (2013.01); *Y10T 428/315* (2015.01)

(58) Field of Classification Search
CPC ......... C03C 3/085; C03C 3/087; C03C 3/091; C03C 21/002; C03C 4/18
See application file for complete search history.

(56) References Cited

U.S. PATENT DOCUMENTS

| | | | |
|---|---|---|---|
| 8,840,997 B2 | 9/2014 | Koyama et al. | |
| 2012/0083401 A1 | 4/2012 | Koyama et al. | |
| 2012/0171497 A1* | 7/2012 | Koyama | C03C 3/085 428/428 |
| 2013/0295366 A1 | 11/2013 | Murata et al. | |
| 2015/0147538 A1 | 5/2015 | Ishimaru et al. | |
| 2015/0376050 A1* | 12/2015 | Nakamura | C03C 3/087 428/410 |

FOREIGN PATENT DOCUMENTS

| | | | | |
|---|---|---|---|---|
| CN | 102417301 | 4/2012 | | |
| JP | 2000-319036 | 11/2000 | | |
| JP | 2010-116276 | 5/2010 | | |
| JP | 2010-527892 | 8/2010 | | |
| JP | 2012-148955 | 8/2012 | | |
| JP | 2012148908 | 8/2012 | | |
| JP | 2012-214356 | 11/2012 | | |
| JP | 2013-193887 | 9/2013 | | |
| JP | WO 2013176150 A1 * | 11/2013 | ............. | C03C 3/085 |
| JP | 5376032 B | 12/2013 | | |
| WO | 2008/143999 | 11/2008 | | |

OTHER PUBLICATIONS

Machine Translation of JP 2013-193887 A, Sep. 30, 2013.*

* cited by examiner

*Primary Examiner* — Elizabeth A Bolden
(74) *Attorney, Agent, or Firm* — Hamre, Schumann, Mueller & Larson, P.C.

(57) ABSTRACT

Provided is a glass composition containing, in mass %: 58 to 64% $SiO_2$; 8 to 12% $Al_2O_3$; 6 to 10% MgO; 0 to 1% CaO; 18 to 24% $Na_2O$; 0 to 3% $K_2O$; 0 to 2% $TiO_2$; and 0 to 3% $ZrO_2$. The total content of MgO, CaO, SrO, and BaO is in a range of 7 to 12%. This glass composition is suitable for production by a float process and for chemical strengthening.

13 Claims, No Drawings

GLASS COMPOSITION, GLASS COMPOSITION FOR CHEMICAL STRENGTHENING, STRENGTHENED GLASS ARTICLE, AND COVER GLASS FOR DISPLAY

TECHNICAL FIELD

The present invention relates to a glass composition suitable for chemical strengthening, more specifically to a glass composition having properties suitable for use as a cover glass of a display. The present invention also relates to a glass composition for chemical strengthening, a chemically-strengthened strengthened glass article, and a cover glass for a display.

BACKGROUND ART

In recent years, electronic devices with liquid crystal displays, organic EL displays, etc. and electronic devices with touch panel displays have been widespread. Since glass materials have high surface hardness, they are widely used as materials of cover glasses of displays of these electronic devices. Cover glasses of displays are sometimes chemically strengthened to improve their mechanical strength.

Chemical strengthening is a technique of replacing alkali metal ions contained in the glass surface by monovalent cations having a larger ionic radius so as to form a compressive stress layer on the glass surface. Chemical strengthening is often performed by replacing lithium ions ($Li^+$) by sodium ions ($Na^+$) or by replacing sodium ions by potassium ions ($K^+$).

A glass composition suitable for chemical strengthening disclosed in Patent Literature 1 contains 64 to 68 mol % $SiO_2$, 12 to 16 mol % $Na_2O$, and 8 to 12 mol % $Al_2O_3$. In this glass composition, the content of $Na_2O$ is higher than that of $Al_2O_3$ by 2 to 6 mol %, and the total content of alkaline earth metal oxides ($MgO+CaO+SrO$) is adjusted to 5 to 8 mol % (claim 1). In addition, the glass composition described in Patent Literature 1 has a melting temperature of less than 1650° C. and a liquidus viscosity of at least 13 kPa·s to be adapted to a down-draw process. In the glass compositions described as examples in Patent Literature 1, the contents of $Al_2O_3$ and $Na_2O$ are 13.99% or more and 13.76% or less, respectively, in terms of mass %. Furthermore, in the examples of Patent Literature 1, the temperatures at which the glass compositions have a viscosity of 200 P (200 dPa·s) are 1536° C. or more and the temperatures at which the glass compositions have a viscosity of 35 kPa (35000 dPa·s) are 1058° C. or more.

A strengthened glass substrate suitable for use in a touch panel display disclosed in Patent Literature 2 contains, in mass %, 45 to 75% $SiO_2$, 1 to 30% $Al_2O_3$, 0 to 20% $Na_2O$, and 0 to 20% $K_2O$ (claim 3). Glass substrates disclosed as examples in Patent Literature 2 contain 13.0 to 24.0 mass % $Al_2O_3$ and 4.1 to 14.5 mass % $Na_2O$. Furthermore, in the examples, the temperatures at which the glass substrates have a viscosity of $10^4$ dPa·s are 1122° C.

A working temperature and a melting temperature are known measures of the high-temperature viscosity of glass. In a float process, the working temperature is a temperature at which glass has a viscosity of $10^4$ dPa·s, and hereinafter may be referred to as $T_4$. The melting temperature is a temperature at which glass has a viscosity of $10^2$ dPa·s, and hereinafter may be referred to as $T_2$.

CITATION LIST

Patent Literature

Patent Literature 1: JP 2010-527892 T
Patent Literature 2: JP 2010-116276 A

SUMMARY OF INVENTION

Technical Problem

Patent Literature 1 and Patent Literature 2 describe or suggest that the glass compositions described therein have relatively high $T_4$ and $T_2$ values and the $T_4$ values are higher than about 1100° C. Glass compositions having high-temperature viscosities ($T_4$ and $T_2$) as disclosed in Patent Literature 1 and Patent Literature 2, in particular, glass compositions having high $T_4$ values are disadvantageous for production by the float process, although they are suitable for production by the down-draw process.

In view of the above circumstances, it is an object of the present invention to provide a glass composition suitable for production by a float process and for chemical strengthening.

Solution to Problem

In order to achieve the above object, the present invention provides a glass composition containing, in mass %: 58 to 64% $SiO_2$; 8 to 12% $Al_2O_3$; 6 to 10% $MgO$; 0 to 1% $CaO$; 18 to 24% $Na_2O$; 0 to 3% $K_2O$; 0 to 2% $TiO_2$; and 0 to 3% $ZrO_2$. The total content of $MgO$, $CaO$, $SrO$, and $BaO$ is in a range of 7 to 12%.

In another aspect, the present invention provides a strengthened glass article including a compressive stress layer formed as a surface of the strengthened glass article by bringing a glass article containing the glass composition of the present invention into contact with a molten salt containing monovalent cations having an ionic radius larger than that of sodium ions so as to allow ion exchange to take place between sodium ions contained in the glass composition and the monovalent cations.

The present invention further provides a cover glass for a display, the cover glass including the strengthened glass article of the present invention.

Advantageous Effects of Invention

The glass composition according to the present invention has a relatively low $T_4$ and thus is suitable for production by the float process. Furthermore, the glass composition according to the present invention has a relatively low softening temperature and thus is suitable for production of a glass article having a three-dimensional shape, in which a glass sheet having the glass composition of the present invention is once produced and then the glass sheet is heated and softened to be formed into the shape.

DESCRIPTION OF EMBODIMENTS

Hereinafter, the percentages of the components of glass compositions are all expressed in mass %, unless otherwise specified. In this description, the phrase "consisting essentially of components" means that the total content of the components referred to is 99.5 mass % or more, preferably 99.9 mass % or more, and more preferably 99.95 mass % or more. The phrase "being substantially free of a component"

means that the content of the component is 0.1 mass % or less, and preferably 0.05 mass % or less.

The glasses disclosed in Patent Literature 1 and Patent Literature 2 have high high-temperature viscosities and high $T_4$ values. A high $T_4$ value is disadvantageous in producing a cover glass of a display by the float process, and is also disadvantageous in forming glass into a thin sheet as a cover glass of a display.

The present invention is intended to reduce the $T_4$ by a thorough study of, in particular, the contents of $Al_2O_3$, $Na_2O$, and alkaline earth oxides in view of the effects of each of these oxides on the properties and by an overall adjustment of the contents of the other components, and thereby to provide a glass composition suitable for production by the float process, in particular, a glass composition advantageous in forming glass into a thinner sheet (for example, with a thickness of 1 mm or less) as a cover glass for a display and resistant to scratching and cracking.

The following points are not essential in the present invention. However, in the present invention, attention can be given to the following points in some cases.

The present invention is intended to provide a glass composition having a relatively low $T_2$ so as to be adapted to a glass melting furnace used in conventional production facilities for the float process. The present invention is also intended to provide a glass composition having a large difference (for example, 20° C. or more) between the $T_4$ and the liquidus temperature TL so as to be adapted to glass formation by the float process.

Hereinafter, the components of the glass composition of the present invention are described respectively.

($Al_2O_3$)

$Al_2O_3$ improves the chemical durability of a glass composition and further facilitates migration of alkali metal ions in the glass. $Al_2O_3$ is also a component that contributes to maintaining the strength obtained by chemical strengthening. On the other hand, an excessively high content of $Al_2O_3$ increases the Tg and makes it difficult to slowly cool molten glass to properly produce a glass sheet. In addition, an excessively high $Al_2O_3$ content increases the viscosity of a glass melt and thus increases the $T_2$ and $T_4$.

Therefore, the appropriate content of $Al_2O_3$ is in a range of 8 to 12%. The content of $Al_2O_3$ is preferably 11.5% or less, more preferably 11% or less, and even more preferably 10.5% or less. The content of $Al_2O_3$ may be 9.8% or less in some cases. The content of $Al_2O_3$ is preferably 8.5% or more, and more preferably 9% or more.

($Na_2O$)

$Na_2O$ is a component that increases the surface compressive stress and thus increases the depth of the compressive stress layer when sodium ions are replaced by potassium ions. $Na_2O$ is also a component that increases the meltability and reduces the $T_4$ and $T_2$. On the other hand, an excessively high content of $Na_2O$ reduces the heat resistance of a glass composition and thus relaxes the stress produced by replacement by potassium ions.

Therefore, the appropriate content of $Na_2O$ is in a range of 18 to 24%. The content of $Na_2O$ is preferably 18.5% or more, and more preferably 19% or more. The content of $Na_2O$ may be 20.1% or more in some cases. The content of $Na_2O$ is preferably 22% or less, and more preferably 21% or less.

(MgO)

MgO is an essential component that increases the meltability of glass. The desirable content of MgO is 6% or more in order to obtain this effect. Generally, alkaline earth oxides (RO components) are likely to inhibit ion exchange, i.e., replacement of sodium ions in a glass composition by potassium ions. Among the RO components, MgO is least likely to inhibit such ion exchange. Therefore, it is preferable that the content of MgO be highest in the RO components. On the other hand, an excessively high content of MgO beyond its limit inhibits migration of sodium ions in the glass. In addition, an excessively high content of MgO increases the liquidus temperature TL of the glass composition.

Therefore, the appropriate content of MgO is in a range of 6 to 10%. The content of MgO is preferably 7% or more, and more preferably 8% or more. The content of MgO may be 9.5% or less in some cases.

(CaO)

CaO has the effect of reducing the viscosity at high temperatures. However, an excessively high content of CaO inhibits migration of sodium ions in a glass composition and makes the glass composition more susceptible to devitrification.

Therefore, the appropriate content of CaO is in a range of 0 to 1%. The content of CaO is preferably 0.7% or less, and more preferably 0.5% or less. The content of CaO may be 0.1% or more.

(SrO and BaO)

SrO and BaO are more effective than CaO in significantly reducing the viscosity of a glass composition and reducing the liquidus temperature TL of the glass composition, if their contents are low. Even if the contents of SrO and BaO are very low, they significantly inhibit migration of sodium ions in the glass composition and cause a significant decrease in both the surface compressive stress and the depth of the compressive stress layer.

Therefore, it is preferable that the glass composition of the present invention be substantially free of SrO and BaO.

(RO Components)

The RO components include MgO, CaO, SrO, and BaO. If the content of RO components is too low, the amount of these components is too small to reduce the viscosity of a glass composition, which makes it difficult to melt the glass composition. On the other hand, if the content of RO components is too high, the chemical durability is reduced, and in addition, migration of sodium ions in the glass is inhibited and thus the progress of chemical strengthening is impeded.

Therefore, the appropriate content of RO components (total content of MgO, CaO, SrO and BaO) is in a range of 7 to 12%. The content of RO components is preferably in a range of 7 to 11%, and more preferably in a range of 7.5 to 10%. The content of RO components may be 9.3% or less.

($SiO_2$)

$SiO_2$ is the main component of a glass composition. An excessively low content of $SiO_2$ reduces the chemical durability and heat resistance of the glass. On the other hand, an excessively high content of $SiO_2$ increases the viscosity of the glass composition at high temperatures and thus makes it difficult to melt and form the glass composition. Therefore, the appropriate content of $SiO_2$ is in a range of 58 to 64%. The content of $SiO_2$ is preferably 58 to 62%.

($K_2O$)

$K_2O$ is a component that increases the depth of a compressive stress layer formed by chemical strengthening. Like $Na_2O$, $K_2O$ is a component that increases the meltability of glass. However, an excessively high content of $K_2O$ reduces the value of the surface compressive stress produced by chemical strengthening. In addition, $K_2O$ is more likely to increase the viscosity ($T_4$ and $T_2$) of the glass composition at high temperatures than $Na_2O$.

Therefore, the appropriate content of 1 (20 is in a range of 0 to 3%. The content of $K_2O$ is preferably 2% or less, and more preferably 1.5% or less. The content of $K_2O$ may be 0.2% or more, and even 0.5% or more.

($Li_2O$)

$Li_2O$ causes a significant decrease in the value of surface compressive stress produced by chemical strengthening, even if its content is low. Therefore, it is preferable that the glass composition of the present invention be substantially free of $Li_2O$.

($B_2O_3$)

$B_2O_3$ is a component that reduces the viscosity of a glass composition and improves the meltability thereof. However, an excessively high content of $B_2O_3$ reduces the water resistance of the glass composition and thus makes the glass composition more susceptible to phase separation. In addition, compounds formed from $B_2O_3$ and alkali metal oxides may vaporize and damage the refractory material of a glass melting chamber. Furthermore, the addition of $B_2O_3$ causes a decrease in the depth of the compressive stress layer formed by chemical strengthening.

Therefore, the appropriate content of $B_2O_3$ is 1% or less. In the present invention, it is more preferable that the glass composition be substantially free of $B_2O_3$.

($Fe_2O_3$)

Fe is normally present in the form of $Fe^{2+}$ or $Fe^{3+}$ in glass. $Fe^{3+}$ is a component that improves the ultraviolet ray absorbing properties of glass, and $Fe^{2+}$ is a component that improves the heat ray absorbing properties of glass. However, when the glass composition is used for a cover glass of a display, it is preferable to minimize the content of Fe to prevent the glass composition from being conspicuously colored. Fe may be inevitably mixed in the glass composition due to an industrial raw material, but it is recommended that the content of total iron oxide be 0.1% or less, and preferably 0.02% or less, as calculated in terms of $Fe_2O_3$ content. In the present invention, the glass composition may be substantially free of iron oxide.

($TiO_2$)

$TiO_2$ is a component that reduces the high-temperature viscosity of glass and increases the value of the surface compressive stress produced by chemically strengthening. However, a high content of $TiO_2$ colors the glass composition yellow, which is not desired. Therefore, the appropriate content of $TiO_2$ is 0 to 2%, and it is preferably 1% or less. There may be a case where $TiO_2$ is inevitably mixed in the glass composition due to an industrial raw material and the glass composition contains 0.05% $TiO_2$, but this low content of $TiO_2$ does not cause undesirable coloring.

($ZrO_2$)

$ZrO_2$ is a component that increases the water resistance of glass. $ZrO_2$ is also a component that significantly increases the value of the surface compressive stress produced by chemical strengthening. However, a high content of $ZrO_2$ may cause a rapid increase in the liquidus temperature TL. Therefore, the appropriate content of $ZrO_2$ is 0 to 3%, and it is preferably 1.5% or less. In the present invention, the glass composition may be substantially free of $ZrO_2$.

($SnO_2$)

In the float process, a sulfate such as sodium sulfate ($Na_2SO_4$) is widely used as a refining agent. A sulfate is decomposed in molten glass to produce a gas component, which promotes degassing of the glass melt, but a portion of the gas component is dissolved in the form of $SO_3$ and remains in the glass composition. In the glass composition of the present invention, the content of $SO_3$ is preferably 0.1 to 0.4%.

($SnO_2$)

It is known that, in formation of a glass sheet by the float process, molten tin in a tin bath diffuses into the glass in contact with the tin bath so as to be present in the form of $SnO_2$. $SnO_2$ also contributes to degassing when it is mixed as one of the glass raw materials. In the glass composition of the present invention, the content of $SnO_2$ is preferably 0 to 0.3%.

(Other Components)

Preferably, the glass composition of the present invention consists essentially of the components (from $Al_2O_3$ to $SnO_2$) mentioned above. The glass composition of the present invention may contain components other than the above-mentioned components. In this case, the content of each of the other components is preferably less than 0.1%.

Examples of the other components that the glass composition may contain include $As_2O_5$, $Sb_2O_5$, $CeO_2$, Cl, and F in addition to the above-mentioned $SO_3$ and $SnO_2$. These components are added to degas the molten glass. However, it is preferable not to add $As_2O_5$, $Sb_2O_5$, Cl, and F because they have serious adverse effects on the environment. Other examples of the components that the glass composition may contain include ZnO, $P_2O_5$, $GeO_2$, $Ga_2O_3$, $Y_2O_3$, and $La_2O_3$. The glass composition may contain components other than the above-mentioned components derived from industrially available raw materials, unless the content of each of these components exceeds 0.1%. Since these components are optionally added if necessary or are inevitably mixed, the glass composition of the present invention may be substantially free of these components.

Hereinafter, the properties of the glass composition of the present invention are described.

(Glass Transition Temperature: Tg)

According to the present invention, it is possible to provide a glass composition having a glass transition temperature (Tg) of less than 580° C., further 570° C. or less, or even 560° C. or less in some cases, and thus it is easier to slowly cool molten glass to produce the glass composition. The lower limit of the glass transition temperature is not particularly limited, and it may be 500° C. or more, preferably 530° C. or more to prevent relaxation of the compressive stress produced by ion exchange.

(Glass Softening Point: Ts)

According to the present invention, it is possible to provide a glass composition having a glass softening point (Ts) of 800° C. or less. It is easy to form the glass composition having a glass softening point of this range into a glass article having a three-dimensional shape by heating and softening a glass sheet once produced and then forming the glass sheet into the shape. The Ts is preferably 780° C. or less, and particularly preferably 760° C. or less.

(Working Temperature: $T_4$)

In the float process, the viscosity of molten glass is adjusted to about $10^4$ dPa·s ($10^4$ P) when the molten glass in a melting furnace is poured into a float bath. In the production by the float process, it is preferable that the temperature (working temperature: $T_4$) at which the molten glass has a viscosity of $10^4$ dPa·s be lower. For example, in order to form the glass into a thin sheet for use as a cover glass of a display, the working temperature $T_4$ of the molten glass is preferably 1080° C. or less. According to the present invention, it is possible to provide a glass composition having a $T_4$ of 1080° C. or less, further 1070° C. or less, or even 1060° C. or less in some cases and thus suitable for production by the float process. The lower limit of the $T_4$ is not particularly limited, and it is 1000° C., for example.

(Melting Temperature: $T_2$)

When the temperature (melting temperature: $T_2$) at which the molten glass has a viscosity of $10^2$ dPa·s is low, the amount of energy required to melt the glass raw materials can be reduced, and the glass raw materials can be more easily dissolved to promote degassing and refining of the glass melt. According to the present invention, it is possible to reduce the $T_2$ to 1530° C. or less, further 1500° C. or less, and more preferably 1480C.° or less.

(Difference between Working Temperature and Liquidus Temperature: $T_4$-TL)

In the float process, it is necessary that molten glass does not devitrify when the temperature of the molten glass is $T_4$. In other words, it is necessary that the working temperature ($T_4$) be higher than the liquidus temperature (TL). According to the present invention, it is possible to provide a glass composition in which a difference obtained by subtracting the liquidus temperature from the working temperature is as large as 20° C. or more, further 50° C. or more, and even 100° C. or more in some cases. In addition, according to the present invention, it is possible to reduce the TL to 1050° C. or less, further 1000° C. or less, and even 900° C. or less in some cases so as to contribute to increasing the difference $T_4$-TL.

(Density (Specific Gravity): d)

It is desirable that a cover glass of a display for an electronic device have a low density to reduce the weight of the electronic device. According to the present invention, it is possible to reduce the density of the glass composition to 2.52 g·cm$^{-3}$ or less, further 2.51 g·cm$^{-3}$ or less, and even 2.50 g·cm$^{-3}$ or less in some cases.

In the float process or the like, when production of glass is changed from one type of glass to another type of glass, if there is a large difference in the density between these two types of glass, a portion of one type of glass having a higher density melts and remains at the bottom of a melting furnace, which may affect the changeover to production of another type of glass. The density of soda lime glass, which is currently mass-produced by the float process, is about 2.50 g·cm$^{-3}$. Therefore, for the mass production by the float process, it is preferable that the glass composition has a density close to the value mentioned above. Specifically, the density of the glass composition is preferably 2.46 to 2.54 g·cm$^{-3}$, and particularly preferably 2.48 to 2.52 g·cm$^{-3}$.

(Elastic Modulus: E)

When a glass substrate is subjected to chemical strengthening by ion exchange, it may be bent. It is preferable that the glass composition have a high elastic modulus to reduce this bending. According to the present invention, it is possible to increase the elastic modules (Young's modulus E) of the glass composition to 70 GPa or more, and even to 72 GPa or more in some cases.

(Thermal Expansion Coefficient: α)

According to the present invention, it is possible to provide a glass composition having a linear thermal expansion coefficient in a range of $95 \times 10^{-7}$/° C. to $109 \times 10^{-7}$/° C. in a temperature range of 50 to 350° C. The glass composition having a linear thermal expansion coefficient in this range has the advantage of being less susceptible to bending or distortion when it is attached to a material having a higher linear thermal expansion coefficient than the linear thermal expansion coefficients ($70 \times 10^{-7}$/° C. to $100 \times 10^{-7}$/° C.) of common glass members. According to a preferred embodiment of the present invention, it is possible to provide a glass composition having a linear thermal expansion coefficient in a range of $100 \times 10^{-7}$/° C. or more in a temperature range of 50 to 350° C.

The chemical strengthening of the glass composition is described below.

(Conditions of Chemical Strengthening and Compressive Stress Layer)

Chemical strengthening of the glass composition of the present invention can be performed by bringing the glass composition containing sodium into contact with a molten salt containing monovalent cations, preferably potassium ions, having an ionic radius larger than that of sodium ions, so as to allow ion exchange to take place between sodium ions in the glass composition and the monovalent cations in the form of replacement of the sodium ions by the monovalent cations. Thus, a compressive stress layer having a surface compressive stress is formed.

A typical example of the molten salt is potassium nitrate. A molten salt mixture of potassium nitrate and sodium nitrate also can be used, but it is preferable to use potassium nitrate alone because it is difficult to control the concentration of a molten salt mixture.

The surface compressive stress and the depth of the compressive stress layer of a strengthened glass article can be controlled not only by the glass composition of the article but also by the temperature of the molten salt and the treatment time in the ion exchange treatment.

It is possible to obtain a strengthened glass article having a compressive stress layer with a very high surface compressive stress (CS) and a moderately small thickness (DOL) by bringing the glass composition of the present invention into contact with a relatively low temperature molten salt of potassium nitrate. Specifically, it is possible to obtain a strengthened glass article having a compressive stress layer with a surface compressive stress of 1200 MPa or more and a depth of 8 to 13 μm. It is possible to obtain this strengthened glass article by bringing the glass composition into contact with a molten salt of potassium nitrate heated at 340 to 380° C. for 30 minutes or more and 8 hours or less, preferably at 350 to 370° C. for 2 to 6 hours.

Thus, since the strengthened glass article of the present invention has a sufficiently high surface compressive stress, it has a strength suitable for use as a cover glass of a display. In addition, since the strengthened glass article of the present invention has a compressive stress layer with a moderately small thickness, it has high workability and thus can be cut by a conventional method even after the chemical strengthening treatment.

It is also possible to obtain, as another embodiment of the strengthened glass article of the present invention, a strengthened glass article having a compressive stress layer with a sufficiently large thickness and a moderately high surface compressive stress by bringing the glass composition of the present invention into contact with a relatively high temperature molten salt of potassium nitrate. Specifically, it is possible to obtain a strengthened glass article having a compressive stress layer with a depth of 25 to 30 μm, although its surface compressive stress is 900 to 1000 MPa. It is possible to obtain this strengthened glass article by bringing the glass composition into contact with a molten salt of potassium nitrate heated at 400 to 440° C. for 30 minutes or more and 8 hours or less, preferably at 410 to 430° C. for 2 to 6 hours.

Thus, since the strengthened glass article of another embodiment of the present invention has a compressive stress layer with a sufficiently large thickness, even if the surface has a scratch, the scratch is less likely to develop into the glass article due to the presence of the compressive stress layer and thus is less likely to damage the strengthened glass article. In addition, this strengthened glass article has a moderately high surface compressive stress. Therefore, it has a strength suitable for use as a cover glass of a display.

According to the present invention, it is possible to provide a glass composition having a relatively low $T_4$, suitable for production by the float process, and advantageous in forming glass into a thin glass sheet for use as a cover glass of a display.

The strengthened glass article obtained by chemically strengthening the glass composition of the present invention is suitable for use as a cover glass of a liquid crystal display, an organic EL display, a touch-panel display, or the like for an electronic device. It should be noted that the glass composition of the present invention does not necessarily have to be subjected to chemical strengthening treatment, and the untreated glass composition also can be used as a substrate for an electronic device or the like.

EXAMPLES

Hereinafter, the present invention will be described in more detail by way of examples.

Examples 1 to 40

(Preparation of Glass Compositions)

As commonly available glass raw materials such as silica, titanium oxide, zirconium oxide, alumina, sodium carbonate, potassium carbonate, basic magnesium carbonate, calcium carbonate, iron (III) oxide, and tin (IV) oxide were used to prepare glass formulations (batches) having the glass compositions shown in Tables 1 to 4. In some examples, sodium sulfate was used instead of sodium carbonate. The batches thus prepared were each put into a platinum crucible and heated in an electric furnace at 1550° C. for 4 hours. Thus, a molten glass was obtained. Next, the molten glass was poured on an iron plate for cooling to obtain a glass plate. Next, this glass plate was again placed in the electric furnace at 580° C. for 30 minutes. Then, the furnace was turned off to slowly cool the glass plate to room temperature. Thus, a glass sample was obtained.

For each glass sample, the glass transition temperature Tg, the glass softening point Ts, the working temperature $T_4$, the melting temperature $T_2$, the liquidus temperature TL, the thermal expansion coefficient α, the density d, and the Young's modulus E were measured.

The glass transition temperature Tg and the thermal expansion coefficient α were measured using a differential thermal analyzer (Thermoflex TMA 8140, manufactured by Rigaku Corporation). The glass softening point Ts was measured by a penetration method. The working temperature $T_4$ and the melting temperature $T_2$ were measured by a platinum ball pulling-up method. The density d was measured by an Archimedes method. The Young's modulus E was measured according to JIS (Japanese Industrial Standards) R 1602.

The liquidus temperature TL was measured in the following manner. The glass sample was pulverized and sieved. Glass particles that passed through a 2380-µm mesh sieve but retained on a 1000-µm mesh sieve were obtained. These glass particles were immersed in ethanol and subjected to ultrasonic cleaning, followed by drying in a thermostat. 25 g of the glass particles were placed in a platinum boat having a width of 12 mm, a length of 200 mm and a depth of 10 mm so as to obtain a measurement sample with a constant thickness. This platinum boat was placed in an electric furnace (a temperature gradient furnace) with a temperature gradient from about 870 to 1160° C. for 24 hours. Then, the measurement sample was observed using an optical microscope with a magnification of 100, and the highest temperature in a region where devitrification was observed was determined to be the liquidus temperature of the sample. In all Examples and Comparative Examples, glass particles in the measurement samples were fused together to form rods in the temperature gradient furnace.

(Production of Strengthened Glass)

The glass sample thus obtained was cut into pieces of 25 mm×35 mm. Both surfaces of each piece were polished with alumina abrasive grains and further mirror-polished with cerium oxide abrasive grains. Thus, four 5 mm-thick glass blocks having surfaces with a surface roughness Ra of 2 nm or less (a surface roughness Ra according to JIS B 0601-1994) were obtained for each composition. These glass blocks were immersed in a molten salt of 99.9% pure potassium nitrate heated at 360° C., 380° C., 400° C., and 420° C., respectively, for 4 hours so as to chemically strengthen the glass blocks. After the chemical strengthening treatment, the glass blocks were washed with hot water at 80° C. Thus, strengthened glass blocks were obtained.

In order to reduce the thermal shock applied to the glass blocks, they were preheated before being immersed in the molten salt and were slowly cooled after being immersed in the molten salt (that is, after being removed from the molten salt). Preheating was performed by placing the glass blocks in a space above the level of the molten salt in a container for 10 minutes. Slow cooling was also performed in the same manner as preheating. This slow cooling also has the effect of returning the molten salt remaining on the removed glass blocks as much as possible to the molten salt container.

For the strengthened glass blocks thus obtained, the surface compressive stress and the compression depth (the depth of the compressive stress layer) were measured using a surface stress meter "FSM-6000" manufactured by Orihara Industrial Co., Ltd. Tables 1 to 4 collectively show the results.

In Examples, the glass transition temperatures Tg were less than 580° C. and the working temperatures $T_4$ were 1080° C. or less. In Examples, the melting temperatures $T_2$ were 1530° C. or less. In all Examples where the difference $T_4$–TL can be obtained by subtracting the liquidus temperature TL from the working temperature $T_4$, the differences $T_4$–TL were 20° C. or more. In Examples, the densities d were 2.48 to 2.52 g·cm$^{-3}$.

In all Examples, strengthened glass articles each having a compressive stress layer with a very high surface compressive stress (1200 MPa or more) and a moderately small thickness (8 to 13 µm) or strengthened glass articles each having a compressive stress layer with a very large thickness (25 to 30 µm) and a moderately high surface compressive stress (900 to 1000 MPa) could be obtained.

Comparative Examples 1 to 6

Glass samples having the glass compositions shown in Table 5 were obtained in the same manner as in Examples. As glass raw materials, boron oxide, strontium carbonate, and lithium carbonate were also used for some glass compositions in addition to the materials used in Examples. Strengthened glass blocks were obtained by the same steps as in Examples. Table 5 also shows the evaluation results of the physical properties.

In Comparative Examples 1 to 3, neither a strengthened glass article having a compressive stress layer with a very high surface compressive stress and a moderately small thickness as described above nor a strengthened glass article having a compressive stress layer with a very large thickness and a moderately high surface compressive stress as described above could be obtained.

In all the glass compositions of Comparative Examples 4 to 6, the working temperatures $T_4$ were higher than 1100° C., which means that these glass compositions are disadvantageous not only for production by the float process but also for formation into a thin glass sheet for use as a cover glass of a display. In addition, in the glass compositions of Comparative Examples 4 and 5, the melting temperatures $T_2$ were higher than 1550° C. Therefore, more energy is required to dissolve and refine these glass compositions.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Composition wt % | $SiO_2$ | 60.2 | 63.4 | 63.6 | 63.7 | 62.9 | 62.1 | 61.1 | 61.0 | 61.2 | 60.8 |
| | $TiO_2$ | 0.6 | 0 | 0 | 0 | 0 | 0 | 0 | 0 | 0 | 0 |
| | $ZrO_2$ | 2.0 | 0 | 0 | 0 | 0 | 0 | 0 | 0 | 0 | 0 |
| | $B_2O_3$ | 0 | 0 | 0 | 0 | 0 | 0 | 0 | 0 | 0 | 0 |
| | $Al_2O_3$ | 9.6 | 9.0 | 9.0 | 9.0 | 9.6 | 9.7 | 9.7 | 10.5 | 9.8 | 10.5 |
| | MgO | 7.7 | 8.3 | 8.6 | 8.7 | 8.0 | 8.3 | 8.9 | 8.3 | 8.6 | 8.3 |
| | CaO | 0.3 | 0.3 | 0.3 | 0.3 | 0.3 | 0.3 | 0.1 | 0.3 | 0.3 | 0.3 |
| | SrO | 0 | 0 | 0 | 0 | 0 | 0 | 0 | 0 | 0 | 0 |
| | $Li_2O$ | 0 | 0 | 0 | 0 | 0 | 0 | 0 | 0 | 0 | 0 |
| | $Na_2O$ | 18.8 | 18.2 | 17.7 | 18.3 | 18.1 | 18.6 | 19.2 | 19.1 | 18.6 | 18.5 |
| | $K_2O$ | 0.8 | 0.8 | 0.8 | 0 | 0.8 | 0.8 | 0.8 | 0.8 | 1.5 | 1.5 |
| | $Fe_2O_3$ | 0.01 | 0.02 | 0.02 | 0.01 | 0.01 | 0.01 | 0.01 | 0 | 0 | 0.01 |
| | $SnO_2$ | 0 | 0 | 0 | 0.0 | 0.3 | 0.1 | 0.1 | 0 | 0 | 0 |
| | $SO_3$ | 0.22 | 0.17 | 0.17 | 0.20 | 0.20 | 0.26 | 0.26 | 0.22 | 0.22 | 0.22 |
| | RO | 7.9 | 8.6 | 9.0 | 9.0 | 8.3 | 8.6 | 8.9 | 8.6 | 8.9 | 8.5 |
| | $R_2O$ | 19.5 | 19.0 | 18.5 | 18.3 | 18.9 | 19.4 | 20.0 | 19.8 | 20.2 | 20.1 |
| $Tg/°$ C. | | 570 | 562 | 572 | 576 | 570 | 567 | 564 | 568 | 556 | 563 |
| $TL/°$ C. | | 956 | 885 | — | — | 893 | 879 | — | 1037 | — | — |
| $T_2/°$ C. | | 1462 | 1514 | 1516 | 1514 | 1530 | 1501 | 1471 | 1487 | 1472 | 1489 |
| $T_4/°$ C. | | 1062 | 1066 | 1069 | 1066 | 1077 | 1062 | 1046 | 1057 | 1049 | 1060 |
| $Ts/°$ C. | | 764 | 760 | 762 | 760 | 768 | 759 | 750 | 758 | 753 | 761 |
| $\alpha/\times10^{-7}$ °C.$^{-1}$ | | 102 | 98.8 | 97.4 | 95.9 | 97.6 | 100.9 | 102.1 | 102.7 | 103.4 | 104.7 |
| $d/g \cdot cm^{-3}$ | | 2.52 | 2.48 | 2.48 | 2.48 | 2.48 | 2.48 | 2.49 | 2.49 | 2.49 | 2.49 |
| E/GPa | | 73.4 | 72.1 | 72.4 | 72.3 | 72.2 | 72.4 | 72.6 | 72.7 | 72.8 | 73 |
| 360° C. 4 hr | CS/MPa | 1339 | 1245 | 1233 | 1264 | 1240 | 1248 | 1255 | 1250 | 1225 | 1219 |
| | DOL/μm | 9.7 | 10.1 | 9.3 | 8.6 | 10.5 | 10.4 | 10.2 | 10.6 | 11.0 | 11.4 |
| 380° C. 4 hr | CS/MPa | 1184 | 1101 | 1115 | 1118 | 1104 | 1107 | 1149 | 1182 | 1116 | 1142 |
| | DOL/μm | 13.7 | 14.2 | 12.9 | 12.3 | 14.3 | 14.5 | 14.3 | 14.3 | 15.7 | 15.8 |
| 400° C. 4 hr | CS/MPa | 1148 | 1002 | 1074 | 1062 | 990 | 1003 | 1016 | 1004 | 1027 | 1015 |
| | DOL/μm | 18.7 | 21.0 | 18.7 | 17.5 | 20.8 | 20.5 | 20.3 | 20.0 | 21.5 | 21.3 |
| 420° C. 4 hr | CS/MPa | 998 | 863 | 916 | 921 | 908 | 901 | 904 | 915 | 901 | 910 |
| | DOL/μm | 28.5 | 26.9 | 24.4 | 23.6 | 26.8 | 26.8 | 26.1 | 26.4 | 28.2 | 28.4 |

TABLE 2

| | | Examples | | | | | | | | | |
|---|---|---|---|---|---|---|---|---|---|---|---|
| | | 11 | 12 | 13 | 14 | 15 | 16 | 17 | 18 | 19 | 20 |
| Composition wt % | $SiO_2$ | 60.1 | 59.9 | 60.5 | 60.1 | 60.2 | 59.8 | 59.7 | 59.9 | 60.6 | 60.4 |
| | $TiO_2$ | 0 | 0 | 0 | 0 | 0 | 0 | 0 | 0 | 0 | 0 |
| | $ZrO_2$ | 0 | 0 | 0 | 0 | 0 | 0 | 0 | 0 | 0 | 0 |
| | $B_2O_3$ | 0 | 0 | 0 | 0 | 0 | 0 | 0 | 0 | 0 | 0 |
| | $Al_2O_3$ | 10.6 | 10.6 | 10.6 | 11.3 | 10.5 | 11.3 | 11.4 | 11.4 | 9.8 | 9.8 |
| | MgO | 8.6 | 8.6 | 8.6 | 8.2 | 8.2 | 7.9 | 8.3 | 8.3 | 9.0 | 9.0 |
| | CaO | 0.3 | 0.3 | 0.3 | 0.3 | 0.3 | 0.3 | 0.3 | 0.3 | 0.3 | 0.3 |
| | SrO | 0 | 0 | 0 | 0 | 0 | 0 | 0 | 0 | 0 | 0 |
| | $Li_2O$ | 0 | 0 | 0 | 0 | 0 | 0 | 0 | 0 | 0 | 0 |
| | $Na_2O$ | 19.6 | 19.1 | 18.5 | 18.5 | 18.5 | 18.4 | 19.5 | 20.1 | 20.3 | 19.7 |
| | $K_2O$ | 0.8 | 1.5 | 1.5 | 1.5 | 2.3 | 2.3 | 0.8 | 0.0 | 0.0 | 0.8 |
| | $Fe_2O_3$ | 0.01 | 0.01 | 0.01 | 0.01 | 0.01 | 0.01 | 0.01 | 0.01 | 0.01 | 0.01 |
| | $SnO_2$ | 0 | 0 | 0 | 0 | 0 | 0 | 0 | 0 | 0 | 0 |
| | $SO_3$ | 0.22 | 0.22 | 0.22 | 0.22 | 0.22 | 0.22 | 0.22 | 0.22 | 0.22 | 0.22 |
| | RO | 8.9 | 8.9 | 8.9 | 8.5 | 8.5 | 8.2 | 8.5 | 8.6 | 9.3 | 9.3 |
| | $R_2O$ | 20.4 | 20.6 | 20.1 | 20.0 | 20.8 | 20.7 | 20.3 | 20.1 | 20.3 | 20.5 |
| $Tg/°$ C. | | 562 | 556 | 564 | 568 | 552 | 556 | 568 | 572 | 564 | 562 |
| $TL/°$ C. | | 1024 | — | — | — | — | — | — | — | — | 985 |
| $T_2/°$ C. | | 1457 | 1459 | 1474 | 1491 | 1475 | 1491 | 1473 | 1471 | 1439 | 1449 |
| $T_4/°$ C. | | 1044 | 1045 | 1054 | 1066 | 1054 | 1065 | 1053 | 1050 | 1028 | 1035 |
| $Ts/°$ C. | | 749 | 752 | 757 | 765 | 757 | 765 | 757 | 755 | 739 | 738 |
| $\alpha/\times10^{-7}$ °C.$^{-1}$ | | 103 | 108.8 | 102.2 | 102 | 103.7 | 103.5 | 103.1 | 102.5 | 103 | 103.4 |
| $d/g \cdot cm^{-3}$ | | 2.49 | 2.49 | 2.49 | 2.49 | 2.49 | 2.49 | 2.49 | 2.49 | 2.49 | 2.50 |
| E/GPa | | 72.7 | 72.9 | 73 | 73.1 | 72.8 | 72.9 | 72.8 | 72.6 | 72.4 | 72.6 |

TABLE 2-continued

|  |  | Examples | | | | | | | | | |
|---|---|---|---|---|---|---|---|---|---|---|---|
|  |  | 11 | 12 | 13 | 14 | 15 | 16 | 17 | 18 | 19 | 20 |
| 360° C. 4 hr | CS/MPa | 1268 | 1227 | 1217 | 1212 | 1202 | 1200 | 1253 | 1284 | 1294 | 1256 |
|  | DOL/μm | 10.3 | 11.2 | 10.9 | 11.3 | 12.5 | 12.8 | 10.8 | 10.1 | 9.3 | 10.1 |
| 380° C. 4 hr | CS/MPa | 1128 | 1081 | 1105 | 1121 | 1068 | 1084 | 1128 | 1081 | 1154 | 1144 |
|  | DOL/μm | 14.7 | 16.5 | 15.1 | 15.3 | 17.4 | 17.6 | 14.7 | 16.5 | 13.5 | 14.2 |
| 400° C. 4 hr | CS/MPa | 988 | 999 | 1028 | 1016 | 968 | 956 | 975 | 964 | 989 | 1032 |
|  | DOL/μm | 19.7 | 21.0 | 19.9 | 19.6 | 23.5 | 23.2 | 19.5 | 18.2 | 18.7 | 19.2 |
| 420° C. 4 hr | CS/MPa | 909 | 900 | 939 | 957 | 911 | 913 | 909 | 901 | 907 | 927 |
|  | DOL/μm | 26.9 | 28.7 | 27.4 | 27.2 | 30.2 | 31.1 | 26.9 | 28.2 | 24.9 | 26.7 |

TABLE 3

|  |  | Examples | | | | | | | | | |
|---|---|---|---|---|---|---|---|---|---|---|---|
|  |  | 21 | 22 | 23 | 24 | 25 | 26 | 27 | 28 | 29 | 30 |
| Composition wt % | $SiO_2$ | 60.2 | 60.3 | 60.3 | 60.6 | 60.7 | 61.0 | 61.2 | 60.8 | 61.1 | 60.6 |
|  | $TiO_2$ | 0 | 0 | 0 | 0 | 0 | 0 | 0 | 0 | 0 | 1.2 |
|  | $ZrO_2$ | 0 | 0 | 0 | 0 | 0 | 0 | 0 | 0 | 0 | 0 |
|  | $B_2O_3$ | 0 | 0 | 0 | 0 | 0 | 0 | 0 | 0 | 0 | 0 |
|  | $Al_2O_3$ | 9.8 | 10.6 | 10.1 | 9.8 | 9.8 | 9.7 | 9.8 | 10.1 | 10.1 | 9.7 |
|  | MgO | 9.0 | 8.6 | 9.0 | 8.8 | 9.0 | 8.8 | 8.8 | 8.7 | 8.7 | 7.9 |
|  | CaO | 0.3 | 0.3 | 0.3 | 0.2 | 0.3 | 0.3 | 0.3 | 0.3 | 0.3 | 0.5 |
|  | SrO | 0 | 0 | 0 | 0 | 0 | 0 | 0 | 0 | 0 | 0 |
|  | $Li_2O$ | 0 | 0 | 0 | 0 | 0 | 0 | 0 | 0 | 0 | 0 |
|  | $Na_2O$ | 19.1 | 20.2 | 19.5 | 19.8 | 19.4 | 19.4 | 19.1 | 19.3 | 19.0 | 19.3 |
|  | $K_2O$ | 1.6 | 0.0 | 0.8 | 0.8 | 0.8 | 0.8 | 0.8 | 0.8 | 0.8 | 0.8 |
|  | $Fe_2O_3$ | 0.01 | 0.01 | 0.01 | 0.01 | 0.01 | 0.01 | 0.01 | 0.01 | 0.01 | 0.01 |
|  | $SnO_2$ | 0 | 0 | 0 | 0 | 0 | 0 | 0 | 0 | 0 | 0 |
|  | $SO_3$ | 0.23 | 0.22 | 0.22 | 0.23 | 0.22 | 0.22 | 0.22 | 0.22 | 0.22 | 0.22 |
|  | RO | 9.3 | 8.9 | 9.3 | 9.1 | 9.3 | 9.1 | 9.1 | 9.0 | 8.9 | 8.4 |
|  | $R_2O$ | 20.7 | 20.2 | 20.3 | 20.5 | 20.2 | 20.2 | 19.9 | 20.1 | 19.8 | 20.0 |
| Tg/° C. |  | 555 | 568 | 565 | 558 | 562 | 561 | 565 | 563 | 567 | 564 |
| TL/° C. |  | — | — | — | — | — | — | — | — | — | 995 |
| $T_2$/° C. |  | 1442 | 1455 | 1447 | 1449 | 1450 | 1459 | 1468 | 1465 | 1475 | 1447 |
| $T_4$/° C. |  | 1034 | 1039 | 1037 | 1034 | 1036 | 1040 | 1046 | 1044 | 1050 | 1034 |
| Ts/° C. |  | 744 | 747 | 745 | 743 | 745 | 747 | 750 | 750 | 753 | 798 |
| $\alpha/\times10^{-7}$° $C.^{-1}$ |  | 104 | 102.7 | 106.3 | 103.1 | 102.5 | 102.1 | 101.3 | 102 | 103.2 | 102.9 |
| d/g · $cm^{-3}$ |  | 2.50 | 2.49 | 2.50 | 2.49 | 2.49 | 2.49 | 2.49 | 2.49 | 2.49 | 2.50 |
| E/GPa |  | 72.8 | 72.5 | 73 | 72.4 | 72.6 | 72.5 | 72.5 | 72.5 | 72.6 | 72.4 |
| 360° C. 4 hr | CS/MPa | 1232 | 1289 | 1256 | 1265 | 1257 | 1259 | 1253 | 1256 | 1250 | 1275 |
|  | DOL/μm | 10.8 | 9.7 | 9.9 | 10.3 | 9.9 | 10.1 | 9.9 | 10.3 | 10.1 | 10.1 |
| 380° C. 4 hr | CS/MPa | 1097 | 1170 | 1152 | 1116 | 1121 | 1111 | 1106 | 1117 | 1113 | 1129 |
|  | DOL/μm | 15.5 | 13.7 | 14.3 | 14.9 | 14.1 | 14.6 | 14.2 | 14.6 | 14.3 | 14.4 |
| 400° C. 4 hr | CS/MPa | 1011 | 977 | 1052 | 974 | 1017 | 1000 | 992 | 995 | 1009 | 1050 |
|  | DOL/μm | 21.2 | 18.5 | 19.0 | 20.7 | 19.3 | 19.8 | 19.7 | 19.9 | 19.5 | 19.3 |
| 420° C. 4 hr | CS/MPa | 911 | 915 | 944 | 902 | 910 | 905 | 908 | 911 | 916 | 923 |
|  | DOL/μm | 27.8 | 25.8 | 26.4 | 26.7 | 26.6 | 25.8 | 25.4 | 25.7 | 26.7 | 27.1 |

TABLE 4

|  |  | Examples | | | | | | | | | |
|---|---|---|---|---|---|---|---|---|---|---|---|
|  |  | 31 | 32 | 33 | 34 | 35 | 36 | 37 | 38 | 39 | 40 |
| Composition wt % | $SiO_2$ | 60.8 | 60.4 | 60.7 | 60.7 | 61.0 | 60.5 | 60.8 | 60.4 | 60.4 | 60.4 |
|  | $TiO_2$ | 1.3 | 1.3 | 1.3 | 0.7 | 0.7 | 0 | 0 | 0 | 0.7 | 1.3 |
|  | $ZrO_2$ | 0 | 0 | 0 | 0 | 0 | 1.0 | 1.0 | 2.0 | 1.0 | 1.0 |
|  | $B_2O_3$ | 0 | 0 | 0 | 0 | 0 | 0 | 0 | 0 | 0 | 0 |
|  | $Al_2O_3$ | 9.7 | 10.0 | 10.0 | 9.8 | 9.8 | 9.7 | 9.7 | 9.7 | 9.7 | 9.7 |
|  | MgO | 8.1 | 7.9 | 7.9 | 8.4 | 8.4 | 8.4 | 8.4 | 8.0 | 8.1 | 7.7 |
|  | CaO | 0.3 | 0.3 | 0.3 | 0.3 | 0.3 | 0.3 | 0.3 | 0.3 | 0.3 | 0.3 |
|  | SrO | 0 | 0 | 0 | 0 | 0 | 0 | 0 | 0 | 0 | 0 |
|  | $Li_2O$ | 0 | 0 | 0 | 0 | 0 | 0 | 0 | 0 | 0 | 0 |
|  | $Na_2O$ | 19.0 | 19.2 | 18.9 | 19.3 | 19.0 | 19.3 | 19.0 | 18.8 | 18.9 | 18.8 |
|  | $K_2O$ | 0.8 | 0.8 | 0.8 | 0.8 | 0.8 | 0.8 | 0.8 | 0.8 | 0.8 | 0.8 |
|  | $Fe_2O_3$ | 0.01 | 0.01 | 0.01 | 0.01 | 0.01 | 0.01 | 0.01 | 0.01 | 0.01 | 0.01 |
|  | $SnO_2$ | 0 | 0 | 0 | 0 | 0 | 0 | 0 | 0 | 0 | 0 |

TABLE 4-continued

| | | Examples | | | | | | | | | |
|---|---|---|---|---|---|---|---|---|---|---|---|
| | | 31 | 32 | 33 | 34 | 35 | 36 | 37 | 38 | 39 | 40 |
| | $SO_3$ | 0.22 | 0.22 | 0.22 | 0.22 | 0.22 | 0.22 | 0.22 | 0.22 | 0.22 | 0.22 |
| | RO | 8.4 | 8.2 | 8.2 | 8.7 | 8.7 | 8.7 | 8.7 | 8.3 | 8.3 | 8.0 |
| | $R_2O$ | 19.7 | 20.0 | 19.7 | 20.1 | 19.8 | 20.0 | 19.7 | 19.6 | 19.7 | 19.6 |
| $Tg/°C$ | | 567 | 566 | 569 | 562 | 565 | 562 | 569 | 575 | 570 | 572 |
| $TL/°C$ | | 1008 | — | — | — | — | — | — | — | — | — |
| $T_2/°C$ | | 1456 | 1453 | 1463 | 1453 | 1462 | 1459 | 1468 | 1468 | 1462 | 1456 |
| $T_4/°C$ | | 1040 | 1039 | 1045 | 1037 | 1043 | 1050 | 1056 | 1066 | 1053 | 1050 |
| $Ts/°C$ | | 801 | 801 | 804 | 772 | 775 | 740 | 743 | 736 | 769 | 794 |
| $\alpha/\times10^{-7}\,°C.^{-1}$ | | 101 | 102.8 | 101.8 | 102.5 | 101.4 | 100.5 | 102.1 | 100.3 | 101.4 | 101.3 |
| $d/g \cdot cm^{-3}$ | | 2.50 | 2.50 | 2.50 | 2.50 | 2.50 | 2.50 | 2.50 | 2.52 | 2.51 | 2.51 |
| E/GPa | | 72.3 | 72.6 | 72.6 | 72.3 | 72.4 | 72.8 | 72.9 | 73.6 | 73.1 | 73.1 |
| 360° C. | CS/MPa | 1262 | 1270 | 1264 | 1265 | 1259 | 1294 | 1278 | 1323 | 1294 | 1298 |
| 4 hr | DOL/μm | 10.0 | 10.2 | 10.1 | 10.1 | 9.9 | 10.1 | 10.1 | 9.9 | 9.9 | 9.8 |
| 380° C. | CS/MPa | 1124 | 1135 | 1131 | 1071 | 1084 | 1106 | 1117 | 1196 | 1143 | 1144 |
| 4 hr | DOL/μm | 14.0 | 14.5 | 14.1 | 14.7 | 14.4 | 14.5 | 14.3 | 13.3 | 13.9 | 13.9 |
| 400° C. | CS/MPa | 1074 | 1041 | 1059 | 1008 | 1027 | 1062 | 1071 | 1132 | 1077 | 1112 |
| 4 hr | DOL/μm | 18.9 | 19.4 | 18.7 | 20.5 | 20.1 | 20.7 | 19.4 | 19.2 | 19.4 | 18.8 |
| 420° C. | CS/MPa | 945 | 941 | 954 | 900 | 904 | 934 | 947 | 995 | 978 | 1000 |
| 4 hr | DOL/μm | 26.6 | 25.9 | 25.2 | 27.1 | 27.4 | 27.1 | 26.7 | 27.9 | 26.2 | 24.6 |

TABLE 5

| | | Comparative Examples | | | | | |
|---|---|---|---|---|---|---|---|
| | | 1 | 2 | 3 | 4 | 5 | 6 |
| Composition | $SiO_2$ | 62.9 | 61.1 | 61.9 | 61.3 | 57.4 | 62.1 |
| wt % | $TiO_2$ | 0 | 0 | 0 | 0 | 0 | 0 |
| | $ZrO_2$ | 0 | 0 | 0 | 0 | 3.8 | 0 |
| | $B_2O_3$ | 0 | 0 | 0 | 0.6 | 2.0 | 0 |
| | $Al_2O_3$ | 8.5 | 9.1 | 9.2 | 16.3 | 12.9 | 12.8 |
| | MgO | 7.7 | 7.5 | 8.1 | 3.6 | 1.9 | 6.3 |
| | CaO | 0.3 | 0.6 | 0.7 | 0.5 | 2.0 | 0 |
| | SrO | 1.4 | 1.6 | 0 | 0 | 0 | 0 |
| | $Li_2O$ | 0 | 0.1 | 0 | 0 | 0 | 0 |
| | $Na_2O$ | 17.3 | 16.7 | 16.9 | 13.7 | 14.7 | 15.5 |
| | $K_2O$ | 1.9 | 3.2 | 3.2 | 3.5 | 4.8 | 3.2 |
| | $Fe_2O_3$ | 0.01 | 0.01 | 0.01 | 0.02 | 0 | 0 |
| | $SnO_2$ | 0 | 0 | 0 | 0.3 | 0.3 | 0 |
| | $SO_3$ | 0.22 | 0.23 | 0.23 | 0.04 | 0.05 | 0.10 |
| | RO | 9.4 | 9.7 | 8.8 | 4.1 | 3.9 | 6.3 |
| | $R_2O$ | 19.1 | 20.0 | 20.1 | 17.1 | 19.4 | 18.7 |
| $Tg/°C$ | | — | 538 | — | 597 | 569 | 585 |
| $TL/°C$ | | — | — | — | <890 | <878 | — |
| $T_2/°C$ | | — | — | — | >1613 | 1561 | — |
| $T_4/°C$ | | — | — | — | >1131 | 1122 | 1149 |
| $Ts/°C$ | | — | — | — | 837 | — | 828 |
| $\alpha/\times10^{-7}\,°C.^{-1}$ | | — | — | — | — | — | — |
| $d/g \cdot cm^{-3}$ | | 2.50 | — | 2.49 | 2.46 | 2.54 | — |
| E/GPa | | 72.6 | — | 72.6 | 72.9 | 75.4 | — |
| 360° C. | CS/MPa | — | — | — | — | — | — |
| 4 hr | DOL/μm | — | — | — | — | — | — |
| 380° C. | CS/MPa | 1019 | — | — | — | — | — |
| 4 hr | DOL/μm | 14.4 | — | — | — | — | — |
| 400° C. | CS/MPa | — | — | — | — | — | — |
| 4 hr | DOL/μm | — | — | — | — | — | — |
| 420° C. | CS/MPa | 842 | 818 | 876 | — | — | — |
| 4 hr | DOL/μm | 26.2 | 27.0 | 30.5 | — | — | — |

INDUSTRIAL APPLICABILITY

The present invention can provide a glass composition suitable for production by a float process and suitable for use, for example, in a cover glass for a display.

The invention claimed is:

1. A glass composition comprising, in mass %:
58 to 64% $SiO_2$;
8 to 12% $Al_2O_3$;
6 to 10% MgO;
0 to 1% CaO;
18 to 24% $Na_2O$;
0 to 3% $K_2O$;
0 to 2% $TiO_2$; and
0 to 3% $ZrO_2$,
wherein a total content of MgO, CaO, SrO, and BaO is in a range from 7 to 12%, and
a temperature $T_4$ at which the glass composition has a viscosity of $10^4$ dPa·s is 1080° C. or lower.

2. The glass composition according to claim 1, consisting essentially of, in mass %:

58 to 62% $SiO_2$;
0 to 1% $B_2O_3$;
8 to 11% $Al_2O_3$;
7 to 10% MgO;
0 to 0.7% CaO;
18 to 22% $Na_2O$;
0 to 2% $K_2O$;
0 to 1% $TiO_2$;
0 to 1.5% $ZrO_2$;
0.02% or less total iron oxide in terms of $Fe_2O_3$;
0.1 to 0.4% $SO_3$; and
0 to 0.3% $SnO_2$,
wherein the total content of MgO, CaO, SrO, and BaO is in a range from 7 to 10%.

3. The glass composition according to claim 2,
wherein the glass composition is substantially free of $B_2O_3$.

4. The glass composition according to claim 1,
wherein a glass softening point Ts is 800° C. or lower.

5. The glass composition according to claim 1,
wherein a temperature $T_2$ at which the glass composition has a viscosity of $10^2$ dPa·s is 1530° C. or lower.

6. The glass composition according to claim 1,
wherein a difference obtained by subtracting a liquidus temperature TL from the temperature $T_4$ is 20° C. or more.

7. A glass composition for chemical strengthening,
wherein the glass composition for chemical strengthening is the glass composition according to claim 1 and is used in a chemical strengthening treatment.

8. A strengthened glass article comprising: a compressive stress layer,
wherein the compressive stress layer is formed as a surface of the strengthened glass article by bringing the glass composition according to claim 1 into contact with a molten salt containing monovalent cations that have an ionic radius larger than an ionic radius of sodium ions so as to allow ion exchange to take place between sodium ions contained in the glass composition and the monovalent cations.

9. The strengthened glass article according to claim 8,
wherein the compressive stress layer has a surface compressive stress of 1200 MPa or more and a depth in a range from 8 to 13 μm.

10. The strengthened glass article according to claim 9,
wherein the compressive stress layer is formed by immersing the glass composition in a molten salt of potassium nitrate heated at temperature in a range from 340 to 380° C. for 30 minutes or more and 8 hours or less.

11. The strengthened glass article according to claim 8,
wherein the compressive stress layer has a surface compressive stress in a range from 900 to 1000 MPa and a depth in a range from 25 to 30 μm.

12. The strengthened glass article according to claim 11,
wherein the compressive stress layer is formed by immersing the glass composition in a molten salt of potassium nitrate heated at temperature in a range from 400 to 440° C. for 30 minutes or more and 8 hours or less.

13. A cover glass for a display, the cover glass comprising the strengthened glass article according to claim 8.

* * * * *

UNITED STATES PATENT AND TRADEMARK OFFICE
CERTIFICATE OF CORRECTION

| | | |
|---|---|---|
| PATENT NO. | : 9,688,565 B2 | Page 1 of 1 |
| APPLICATION NO. | : 14/766331 | |
| DATED | : June 27, 2017 | |
| INVENTOR(S) | : Senshu et al. | |

It is certified that error appears in the above-identified patent and that said Letters Patent is hereby corrected as shown below:

On the Title Page

Item (56), Column 2, under "Foreign Patent Documents", Line 9, delete "JP WO 2013176150" and insert -- WO 2013176150 --.

In the Specification

Column 1, Line 34, delete "(K-)." and insert -- (K+). --.

Column 5, Line 1, delete "1 (20" and insert -- $K_2O$ --.

Column 5, Lines 22-24, delete "Therefore, the appropriate ........of $B_2O_3$." and insert the same on Line 21 after "strengthening." as a continuation of the paragraph.

Column 5, Line 59, delete "($SnO_2$)" and insert -- ($5O_3$) --.

Column 7, Line 9, delete "1480C.°" and insert -- 1480° C. --.

Column 7, Line 56, delete "109×1ff $^{70}$ C." and insert -- 109×1ff $^{7/°}$ C. --.

In the Claims

Column 18, in Claim 10, Line 17, after "heated at" insert -- a --.

Column 18, in Claim 12, Line 27, after "heated at" insert -- a --.

Signed and Sealed this
Seventh Day of November, 2017

Joseph Matal
*Performing the Functions and Duties of the
Under Secretary of Commerce for Intellectual Property and
Director of the United States Patent and Trademark Office*